C. C. CROSSLEY.
DOOR GAGE.
APPLICATION FILED JULY 17, 1917.
1,264,371. Patented Apr. 30, 1918.
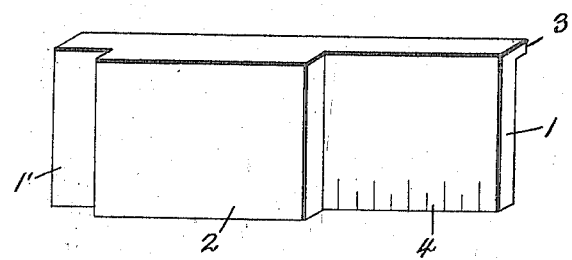
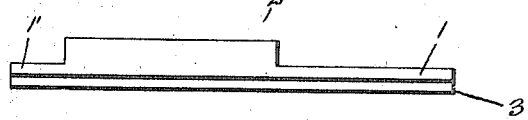
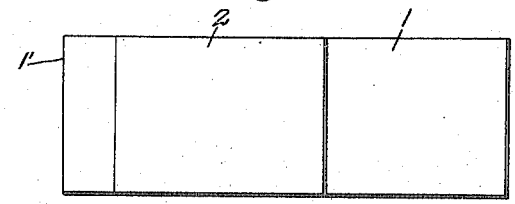
C. C. Crossley

UNITED STATES PATENT OFFICE.

CHARLES C. CROSSLEY, OF STRUTHERS, OHIO.

DOOR-GAGE.

1,264,371.      Specification of Letters Patent.      Patented Apr. 30, 1918.

Application filed July 17, 1917.   Serial No. 181,120.

*To all whom it may concern:*

Be it known that I, CHARLES C. CROSSLEY, a citizen of the United States, residing at Struthers, in the county of Mahoning and State of Ohio, have invented a new and useful Door-Gage, of which the following is a specification.

The subject of this invention is a gage designed especially for use in marking doors, and the objects of the invention are, first, to provide a door gage which will indicate the position of the casing with respect to the jamb, and the position of the door stop, second, to provide a gage which will indicate the length, breadth and thickness of a butt and permit marking the same without changing the position of the gage, third, to provide a gage with a butt leaf thickness indicator which acts as a guide or square for the gage, fourth, to provide a simple, durable, and efficient gage.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

A practical embodiment of the invention is shown in the accompanying drawings, wherein:—

Figure 1 is a perspective view of the device;

Fig. 2 is a side elevation;

Fig. 3 is a front elevation;

Fig. 4 is an end elevation.

Referring to the drawing by numerals of reference:—

The gage consists of a block 1 which is preferably in the form of a right prism, as shown. Extending from one face of the block 1 is a rectangular projection 2, which is preferably integral with the block 1 and which acts as a stop or guide during certain operations of the gage. Projecting from the opposed face of the block 1, and positioned along a longitudinal edge thereof, is a laterally extending flange 3. The depth of the flange 3 is made equal to the thickness of a butt leaf.

It will be noted that the projection 2 is so positioned that the portions of the block 1 projecting longitudinally therebeyond are of unequal lengths. The portion designated by the numeral 1' is three-eighths of an inch in length, while the opposite portion is one and three-eighths inches in length.

The shorter portion gives the distance the casing must be set back from the face of the jamb to allow room for the round of the standard butt. The longer portion of the gage is of proper length to indicate the position of the door stop. The block 1 is of a length and width equal to that of the standard door butt, and the flange 3 is of a width equal to the thickness of the leaf of such butt.

It will be understood, of course, that the gages may be made in different sizes to meet the requirement of heavier doors and larger hinges than the standard or usual size. It will also be noted that a graduated scale, indicated at 4 may be formed along one edge of the longer portion of the block 1 to be used when the door stop is to be set at a position other than that usual for the standard weight door.

In practice the device is used as follows:

To locate the proper position of the boards forming the facing or casing of the door, the side face of the portion 1' is placed against the edge of a board of the door jamb with the adjacent end of projection 2 resting against the face of said board. The end of the portion 1' will then mark the position of the edge of the facing board, that is the distance which the facing board is set back from the face of the jamb board.

To locate the position of the door stop the end of projection 2 which is adjacent the longer portion of the device is brought against and flush with the edge of one board of the doorjamb with the longer portion projecting along the face of said board. The end of the longer portion will then indicate the location of the door engaging edge of the door stop. This operation is of course repeated on each portion of the jamb to completely locate the stop.

The rear face of the block 1 is brought against the face of the jamb and the flange 3 against the edge of the jamb and a sharp instrument drawn along the side and end edges of the block 1 and the edges of the flange 3 which will outline all dimensions of the cut to be made in the jamb to receive the butt leaf. The same operation is repeated on the edge of the door to gage the cut to be made therein.

Having thus described the invention, what is claimed as new and sought by Letters-Patent, is:—

1. A door gage, comprising a block, and a projection extending from one face of the block and providing unequal end portions on the block constituting a door casing gage and a door stop gage.

2. A door gage, comprising a block, a projection extending from one face of the block and providing unequal end portions on the block constituting a door casing gage and a door stop gage, and means on the block constituting a mortise gage.

In testimony that I claim the foregoing as my own, I have hereto affixed my signature in the presence of two witnesses.

CHARLES C. CROSSLEY.

Witnesses:
 M. L. McCRACKEN,
 ANNA M. DAVIS.

Copies of this patent may be obtained for five cents each, by addressing the "Commissioner of Patents, Washington, D. C."